United States Patent [19]

Seely

[11] 4,032,806
[45] June 28, 1977

[54] BATTERY POWERED POWER TOOLS

[75] Inventor: Robert West Seely, Easley, S.C.

[73] Assignee: The Singer Company, New York, N.Y.

[22] Filed: Feb. 2, 1976

[21] Appl. No.: 654,330

[52] U.S. Cl. .................................. 310/50; 310/71; 310/89; 320/2; 85/1 K
[51] Int. Cl.² ........................................ H02K 7/14
[58] Field of Search .................. 310/50, 47, 89, 71, 310/91; 151/69; 339/92; 85/1 K; 292/251; 320/2

[56] References Cited
UNITED STATES PATENTS

| 2,907,419 | 10/1959 | Klank | 151/69 |
| 3,018,127 | 1/1962 | Dobrosielski | 151/69 |
| 3,213,303 | 10/1965 | Riley | 310/50 |
| 3,221,794 | 12/1965 | Acres | 151/69 |
| 3,533,119 | 10/1970 | Dokos | 320/2 |
| 3,679,958 | 7/1972 | Chambers | 320/2 |
| 3,703,646 | 11/1972 | Jacyno | 310/47 |
| 3,734,207 | 5/1973 | Fishbein | 310/50 |
| 3,829,721 | 8/1974 | Rosenthal | 310/47 |

FOREIGN PATENTS OR APPLICATIONS

| 727,499 | 11/1942 | Germany | 85/1 K |
| 956,936 | 4/1964 | United Kingdom | 310/50 |

Primary Examiner—R. Skudy
Attorney, Agent, or Firm—Edward L. Bell; Robert E. Smith; Harold Weinstein

[57] ABSTRACT

A battery powered power tool which includes a housing having one portion for journaling the motor and another portion detachably connected thereto, for carrying the battery pack. Suitable plug and socket means are provided in each of the housing portions, so that when such portions are interconnected, the battery pack will be in circuit with the motor. Connecting means in the form of a retaining nut non-rotatively affixed to the motor portion of the housing, and a rotative screw carried by the battery portion of the housing serve to mechanically join the housing portions. The screw is retained in the battery portion by a neck-down portion formed in the aperture in which the screw is disposed. The screw will be threaded or otherwise forced through the neck-down portion which resiliently yields to permit passage of the enlarged threaded section thereof.

6 Claims, 9 Drawing Figures

BATTERY POWERED POWER TOOLS

BACKGROUND OF THE INVENTION

Heretofore, power tools of the prior art using batteries as a source of power, have used various devices to hold the battery pack in place. Since the batteries require recharging after a period of use, it has always been required to make provision for removing the battery pack. The use of self-contained, quick release devices have been proved to be less advantageous than first thought, in that they break easy, are subject to excessive wear, and can result in accidental disconnection. If a separate positive mechanical connection is used, additional separate and unconnected parts are involved, so that their loss may result in operator aggravation and the necessity to replace such parts.

SUMMARY OF THE INVENTION

It is an object of the present invention to provide an improved battery powered power tool which overcomes the prior art disadvantages; which is simple, economical and reliable; which uses a battery housing portion mechanically connected to the motor housing portion; which uses a screw to mechanically connect the battery housing portion to the motor housing portion of the housing; which uses a screw which is self-retained in the battery housing portion; which uses a battery housing portion made of a plastic material which includes an aperture having a necked-down portion that is pliable and will resiliently yield to permit passage of the screw while acting to retain the same; and which uses a screw of longer longitudinal length than the length of the battery portion of the housing.

Other objects and advantages will be apparent from the following description of one embodiment of the invention, and the novel features will be particularly pointed out hereinafter in the claims.

BRIEF DESCRIPTION OF THE DRAWINGS

This invention is illustrated in the accompanying drawings in which.

DESCRIPTION OF THE INVENTION

Figure 1:
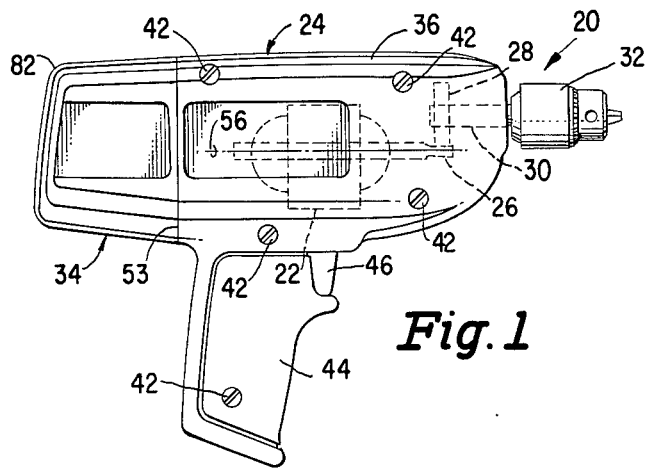
FIG. 1 is a side elevational view of a power tool such as a portable drill, embodying the present invention.

A power tool, such as a portable power drill 20, is shown in FIG. 1 embodying the present invention. The drill 20 includes a direct current electric motor 22, suitably journaled in a housing 24. The motor 22 has a drive pinion 26 extending from its forward end to drivingly engage a gear train 28 which in turn, drives a spindle 30, the projecting end of which carries a chuck 32, as illustrated in FIG. 1.

Figure 2:
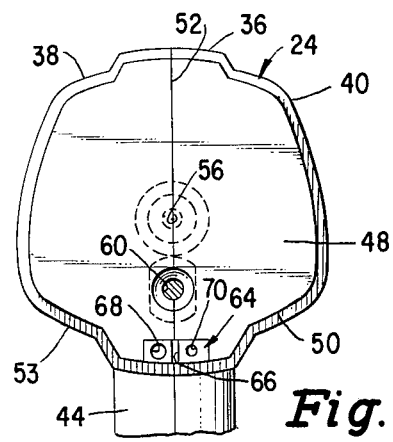
FIG. 2 is a sectional side view, taken along line 2—2 of FIG. 3.

The housing 24 includes a battery portion 34, detachably connected as described hereinafter to a motor portion 36 of the housing 24. The battery portion 34 is disposed at the rear end of the drill 20, and acts as a counterweight to the weight of the motor 22 to provide a well-balanced drill 20 that is easy and convenient for the operator to hold and use. The motor portion 36, as shown in FIGS. 1 and 2, has a support member 38 and a cover member 40 suitably connected to each other as by screw means 42, so as to form what is commonly termed a clam-shell housing for the motor portion 36. The motor portion 36 has an integrally formed pistol-grip handle 44 which carries a trigger switch 46 at its upper forward end. The switch 46 may be a conventional on-off switch, and is connected in circuit with the motor 22 as is shown in the circuit diagram, FIG. 9.

A planar wall 48 is formed at the rear of the housing motor portion 36 just behind the handle 44 and is substantially parallel thereto. A peripheral annular recess 50 which follows the contoured shape of the housing end 53 of the motor portion 36, is formed radially outwardly of the wall 48. Both the wall 48 and the recess 50 have complementary and aligned components formed in each of the housing halves of the support member 38 and the cover member 40, which mate along the split line 52 illustrated in FIG. 2. It will be understood that while one reference character is used for such components which are joined at the split line 52, that this is their operative assembly and on separation of the housing portion 36, each would have a support half component embodied in the support member 38, and a corresponding cover half component embodied in the cover member 40. However, since such components consist of mirror images of each other which unite at the split line 52, independent reference characters have not been used.

Figure 3:
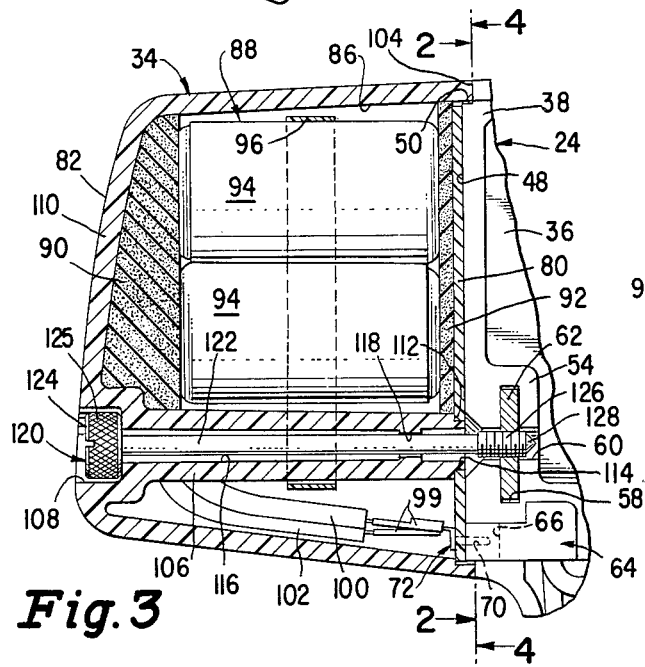
FIG. 3 is an enlarged fragmentary sectional view, showing the connecting means of the present invention.
Figure 5:
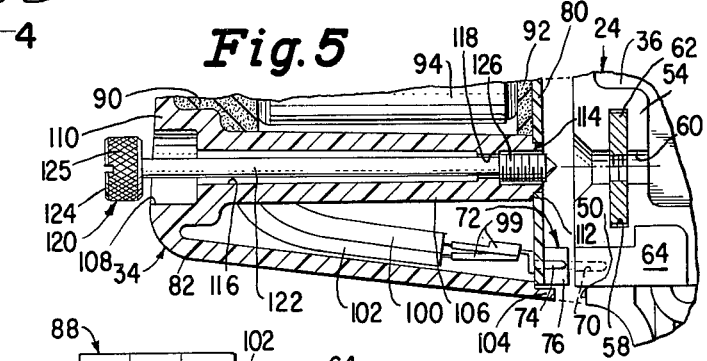
FIG. 5 is an enlarged fragmentary sectional view, partially exploded, showing the battery housing portion disconnected from the motor housing portion.

A boss 54 illustrated in FIGS. 3 and 5 is formed inwardly of the rear wall 48 below the axis 56 of the motor 22, shown in FIGS. 1 and 2, and adjacent to and on either side of the split line 52. A slotted recess 58 is formed in the boss 54 parallel to and inwardly from the rear wall 48. A countersunk aperture 60 extends axially on both sides of the split line 52 and through the boss 54 to intersect the recess 58. Prior to assembly, a retaining nut 62 in inserted into one of the halves of the recess 58 to be non-rotatively entrapped therein by the other half upon assembly of the motor portion 36, so that its central threaded opening is exposed within the aperture 60.

Figure 9:
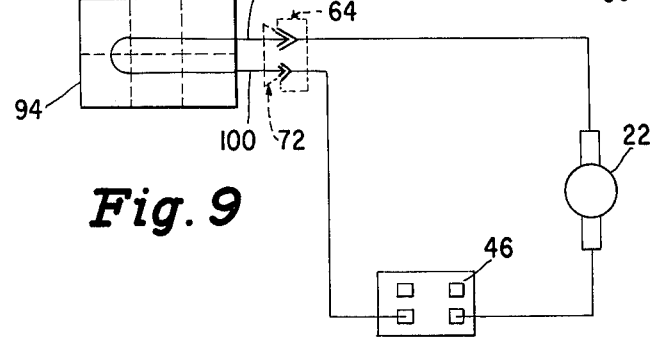
FIG. 9 is an electrical circuit diagram of a power tool of the present invention.

A socket 64 is suitably connected or affixed to the motor portion 36 below the boss 54 so as to have its outer face lie in the plane of the wall 48 with a notch 66 lying along the split line 52 and extending inwardly from the wall 48, as illustrated in FIGS. 2, 3 and 5. The socket 64 has an enlarged female plug or post receptacle 68 lying on the left side of the notch 66, as viewed in FIG. 2, and a smaller female plug or post receptacle 70 lying on the right thereof. As shown in FIG. 9, the socket 64 is in circuit with the motor 22 and the on-off switch 46.

Male plugs or terminal posts 72 have a small diameter post 74, extending on one side of a tab 76 with an enlarged diameter post 78 extending on the other side with each of the posts projecting outwardly from the planar end wall 80 of the battery portion 34. The terminal post 72 is illustrated is FIGS. 3, 4 and 5 to be located at the bottom in a complementary position, whereby on connection of the battery portion 34 to the motor portion 36, the terminal post 72 will mate with the socket 64 to permit insertion of the post 74 and 78 within the receptacles 70 and 68, respectively. By providing one larger and one smaller post and receptacle, the integrity of the circuit is guaranteed as shown in the circuit diagram of FIG. 9, whereby any mis-assembly or mis-connection is thus prevented. The tab 76 is axially longer than the posts 74 and 78 to prevent short circuiting thereof. The tab 76 is sized to fit within the notch 66 as shown in FIG. 3.

Figure 4:
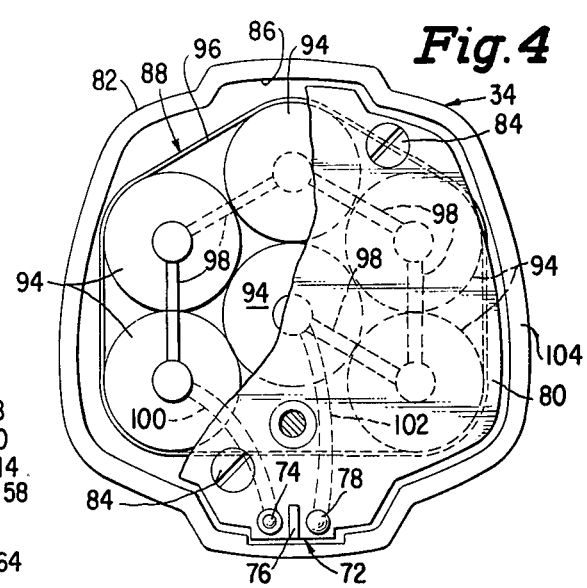
FIG. 4 is a sectional side view, taken along line 4—4 of FIG. 3.

The battery portion 34 has a cup-shaped end cap 82 to which the end wall 80 is affixed as by screws 84, shown in FIG. 4. A hollow space is formed within the end cap 82 to define a battery chamber 86, into which a battery pack 88 is removably disposed and fixedly held in place between a rear foam pad 90 and a front foam pad 92 by the end wall 80 being connected to the end cap 82. The battery pack 88 is illustrated in FIGS. 3 and 4, and in the preferred embodiment is made up of six sub-C nickel cadmium batteries 94 formed into a pack by a strap 96. The batteries 94 are connected in series by a plurality of intermediate leads 98. Slide connectors 99 are soldered or crimped to the ends of leads 100 and 102 respectively to permit detachable connection to the terminal post 72. Lead 100 is mechanically connected by a connector 99 to the small terminal post 74, and lead 102 is mechanically connected by a connector 99 to the large terminal post 78. Thus, the battery pack 88 is self-contained and the user can remove or replace it as a unit without having to deal separately with any single batteries 94. All that need be done is to remove the end wall 80, disconnect the connectors 99, 99 and slide the pack 88 out of the end cap 82. A new unit can then be installed by the reverse procedure wherein the strap 96 which holds the batteries 94 in a pack 88 is passed about a retaining sleeve 106 which lies below the middle two batteries 94, as shown in FIG. 4.

When the terminal posts 72 connect to the socket 64 as shown in FIG. 3 and represented diagrammatically in FIG. 9, the electrical circuit for drill 20 is completed, and assuming that battery pack 88 is charged, the drill 20 may be operated in the conventional manner responsive to positioning the trigger switch 46 in the "on" position or the "off" position.

End cap 82 is made of a plastic dielectric material, and may be formed of a single piece. The front end of cap 82, which receives the end wall 80, has a protruding annular flange 104 which is sized and shaped to correspond to that of the recess 50, whereby on the housing portions 34 and 36 being joined together, the shoulder 104 will nest within the recess 50, as illustrated in FIGS. 3 and 5.

The longitudinal sleeve 106 illustrated in FIGS. 3 and 5 is formed a short distance above the terminal post 72 and extends from a countersunk portion 108 formed in the rear wall 110 of the end cup 82 to a shoulder portion 112 which fits into an aperture 114 of the retaining wall 80. The retaining sleeve 106 defines a longitudinal aperture 116 which has a necked-down portion 118 formed adjacent to and inwardly of the shoulder 112. The necked-down portion 118 extends radially inwardly of the aperture 116, so as to form a constriction of reduced cross-sectional area.

A screw 120 having an elongated shank 122 terminating in an enlarged slot head 124 having a diamond knurled side 125 at one end, and an enlarged threaded section 126 having a tapered tip 128 at the other end.

The diameters of the various screw 120 sections are such that the shank 122 is of a larger diameter than the necked-down portion 118, but a smaller diameter than the diameter of the aperture 116. The head 124 is of a larger diameter than the aperture 116, but of a smaller diameter than of the coutersunk portion 108. The threaded section 126 is of a smaller diameter than the aperture 116, but a larger diameter than the necked-down portion 118.

Figure 6:
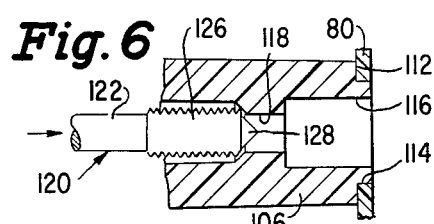
FIGS. 6, 7 and 8 are diagrammatic representations of the steps of connecting and retaining the screw within the battery housing portion.
Figure 7:
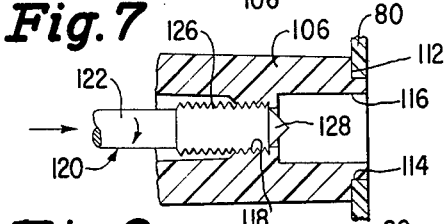
Figure 8:
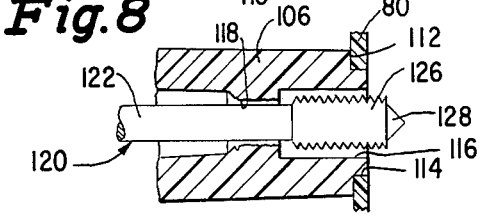

The screw 120 will be retained within the aperture 116 of the sleeve 106, as is shown in FIGS. 3 and 5. In order to insert the screw 120 into and through the sleeve 106, reference may be had to FIGS. 6, 7 and 8, wherein a diagrammatic representation is shown whereby the necked-down portion 118 is pliable, will initially yieldably receive the tapered tip 128 of the screw 120, as is shown in FIG. 6, and thereafter the screw 120 will be rotated while being urged forwardly or rightwardly, as shown in FIG. 7, The screw is made of a suitable metal, such as stainless steel, and will be substantially harder than the necked-down portion 118 which is made of a pliable or resiliently yieldable plastic material. The result is that the screw can be threaded through the necked-down portion 118, which is compressed to permit passage of the threaded section 126, and thereafter will sufficiently expand, though not necessarily returning to its original dimensions, to still be sufficiently small to prevent accidental removal of the screw 120 from the sleeve 106, as by mere leftward axial movement as shown in FIG. 5, as the threaded section 126 will hit against the necked-down portion 118. Thus, the screw 120 will be retained within the sleeve 106 in a manner which permits a limited amount of axial movement of the screw 120 and unrestricted rotative movement thereof.

After the battery portion 34 is completely assembled, as is shown in FIGS. 3 and 4, it will be placed adjacent the motor portion 36 as shown in FIG. 5, wherein on connecting the terminal posts 72 to the socket 64 with the flange 104 nested in the recess 50, the operator will urge the screw 120 forwardly into engagement with the nut 62, and by rotating the head 124 the threaded section 126 will be threadedly connected to the nut 62 to securely fasten the battery portion 34 to the motor portion 36, as illustrated in FIG. 3, in a detachable manner (See FIG. 5). Whenever it becomes desirable to charge the battery pack 8, the screw 120 will be rotated in the opposite direction, to disconnect it from the retaining nut 62 which permits the battery portion 34 to be disconnected from the motor portion 36, and the plug 72 from the socket 64. Thereafter, once the battery pack 88 is recharged or replaced in the end cap 82, the assembled battery portion 34 can simply be reconnected to the motor portion 36 as set forth above, to once again complete the assembly of the drill 20 and render the same operative upon suitable actuation of the trigger switch 46.

A battery powdered power tool must be made so as to permit easy detachment of its battery pack and battery housing portion, while providing for the positive reconnection thereof. In the present invention, this is provided by the two metal components; namely, the screw 120, and the nut 62, so as to permit repeated connection and disconnection of the specific components and the battery portion 34 to the motor portion 36. Furthermore, the screw 120 will be retained within the sleeve 106 of the battery portion 34 by the positive means of the necked-down portion 118 which was temporarily deformed to resiliently yieldably permit the initial passage of the screw 120, but serves to prevent easy or accidental removal of the screw 120 from the sleeve 106. The construction is such as to permit ready alignment of the operative parts and easy connection or disconnection thereof.

Assuming the motor portion 36 of the housing is made of a dielectric plastic material, the drill 20 would be double insulated in that the housing would provide a second barrier to protect the operator from electrical shock upon breakdown of the primary insulation. This is of some advantage, though in battery powered power tools, it is not as serious a problem as in those tools run from the house electrical current.

It will be understood that the various changes in the details, materials, arrangements of parts and operating conditions which have been herein described and illustrated in order to explain the nature of the invention, may be made by those skilled in the art, within the priciples and scope of the invention.

Having thus set forth the nature of the invention, what is claimed herein is:

1. A power tool having a motor powered by a battery pack comprising:
   a. a housing having one portion for journaling the motor and another portion for carrying the battery pack;
   b. plug and socket means separately carried on each of the housing portions and detachably connectable to each other to place the battery pack in circuit with the motor;
   c. connecting means including a nut carried in the motor portion of the housing, and a screw carried by the battery portion of the housing and adapted to be mechanically connected to the nut to join the housing portions, and the plug and socket means operatively together;
   d. the screw having a longitudinal shank intermediate and en enlarged head at one end, and a threaded section at the other end;
   e. a longitudinal aperture formed in the battery portion of the housing;
   f. a necked-down portion formed in the aperture of a cross-sectional area larger than the shank, and smaller than the head and threaded section of the screw, whereby upon the screw being forced through the neck-down portion of the aperture the screw will remain normally entrapped therein by the neck-down portion with the screw free to rotate in the aperture;
   g. the motor portion of the housing having two interconnected clamshell members;
   h. a recess formed in each of the clamshell members in alignment with each other; and,
   i. the nut disposed in the recesses to be held non-rotatively therein upon the clamshell members being interconnected.

2. The combination claimed in claim 1 wherein:
   a. The neck-down portion is formed of a pliable material which will resiliently yield to permit the threaded section of the screw to pass axially therethrough upon rotation of the screw.

3. The combination claimed in claim 2 wherein:
   a. A tapered tip is formed on the leading edge of the screw adjacent the threaded section to facilitate easy entrance into and through the neck-down portion of the aperture.

4. A power tool having a motor powered by a battery pack comprising:
   a. a housing having one portion for journaling the motor and another portion for carrying the battery pack;
   b. plug and socket means separately carried on each of the housing portions and detachably connectable to each other to place the battery back in circuit with the motor;
   c. connecting means including a non-rotative member carried by one of the housing portions, and a rotative member carried by the other housing portion and adapted to be mchanically connected to the non-rotative member to join the housing portions and the plug and socket means operatively together;
   d. the non-rotative member defining a nut;
   e. The rotative member defining a screw;
   f. The screw having a longitudinal shank intermediate and an enlarged head at one end, and a threaded section at the other end;
   g. a longitudinal aperture formed in the housing portion carrying the screw;
   h. a necked-down portion formed in the aperture of a cross-sectional area larger than the shank, and smaller than the head and threaded section of the screw, whereby upon the screw on being forced through the neck-down portion of the aperture will remain normally entrapped therein while the screw is free to rotate in the aperture;
   i. the housing portion carrying the screw is made of a plastic material; and,
   j. the neck-down portion is pliable and will resiliently yield to permit passage of the threaded section of the screw.

5. The combination claimed in claim 4 wherein:
   a. the screw is longitudinally of greater length than the housing portion carrying the screw;
   b. the aperture having a coutersunk portion thereof at one end; and
   c. the head to nest in the countersunk portion of the aperture when the connecting means are joined.

6. The combination claimed in claim 5 wherein:
   a. each of the housing portions has a substantially flat face at their respective ends thereof which are joined together by the connecting means;
   b. A peripheral annular recess formed adjacent the flat face of one of the housing portions; and
   c. a peripheral flange formed adjacent the flat face of the other housing portion and adapted to fit within the recess of the other housing portion upon the connecting means joining the housing portions together.

* * * * *